US011417876B2

(12) United States Patent
Horikawa

(10) Patent No.: US 11,417,876 B2
(45) Date of Patent: Aug. 16, 2022

(54) POSITIVE ELECTRODE ACTIVE MATERIAL AND NONAQUEOUS ELECTROLYTE SECONDARY BATTERY INCLUDING POSITIVE ELECTRODE ACTIVE MATERIAL

(71) Applicant: TOYOTA JIDOSHA KABUSHIKI KAISHA, Toyota (JP)

(72) Inventor: Daisuke Horikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 156 days.

(21) Appl. No.: 16/749,237

(22) Filed: Jan. 22, 2020

(65) Prior Publication Data

US 2020/0243849 A1 Jul. 30, 2020

(30) Foreign Application Priority Data

Jan. 30, 2019 (JP) .............................. JP2019-014819

(51) Int. Cl.
*H01M 4/36* (2006.01)
*H01M 10/0525* (2010.01)
*H01M 4/485* (2010.01)
*H01M 4/62* (2006.01)
*H01M 4/02* (2006.01)

(52) U.S. Cl.
CPC ........... *H01M 4/366* (2013.01); *H01M 4/485* (2013.01); *H01M 4/62* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| 2013/0260250 A1* | 10/2013 | Yada ..................... | H01M 4/485 |
| | | | 429/231.95 |
| 2016/0301063 A1* | 10/2016 | Yukinobu ............. | H01M 4/049 |
| 2018/0166682 A1 | 6/2018 | Lee et al. | |

FOREIGN PATENT DOCUMENTS

| JP | 2008-41502 A | 2/2008 |
| JP | 2011-210694 A | 10/2011 |
| JP | 2018-508926 A | 3/2018 |

OTHER PUBLICATIONS

U.S. Appl. No. 16/597,486, filed: Oct. 9, 2019; Inventor: Daisuke Horikawa.

* cited by examiner

*Primary Examiner* — Zhongqing Wei

(74) *Attorney, Agent, or Firm* — Sughrue Mion, PLLC

(57) ABSTRACT

A positive electrode active material used for a nonaqueous electrolyte secondary battery, includes a base portion, a dielectric, and a carbonate compound. The base portion is formed of a compound storing and releasing a charge carrier. The dielectric is disposed on at least a part of a surface of the base portion. The carbonate compound is disposed on at least a part of the surface of the base portion.

8 Claims, 2 Drawing Sheets

POSITIVE ELECTRODE ACTIVE MATERIAL AND NONAQUEOUS ELECTROLYTE SECONDARY BATTERY INCLUDING POSITIVE ELECTRODE ACTIVE MATERIAL

INCORPORATION BY REFERENCE

The disclosure of Japanese Patent Application No. 2019-014819 filed on Jan. 30, 2019 including the specification, drawings and abstract is incorporated herein by reference in its entirety.

BACKGROUND

1. Technical Field

The disclosure relates to a nonaqueous electrolyte secondary battery. Specifically, the disclosure relates to a positive electrode active material for a nonaqueous electrolyte secondary battery.

2. Description of Related Art

A nonaqueous electrolyte secondary battery is lightweight and can obtain high energy density, and thus is widely used as a portable power supply for a personal computer, a portable device, or the like or as a power supply for driving a vehicle. Among these uses, high output characteristics are required for a nonaqueous electrolyte secondary battery used as a power supply for driving a vehicle.

As a method of reducing an internal resistance of a battery in order to improve the output characteristics, for example, Japanese Unexamined Patent Application Publication No. 2011-210694 (JP 2011-210694 A) discloses a positive electrode active material having a surface on which a ferroelectric is sintered. In JP 2011-210694 A, by sintering the ferroelectric as described above, a surface of the ferroelectric in contact with a nonaqueous electrolytic solution is positively charged and an interface between the ferroelectric and the positive electrode active material is negatively charged due to a potential difference between a positive electrode and a negative electrode. Therefore, a repulsive force is applied to the nonaqueous electrolytic solution in contact with the ferroelectric, and an attractive force is applied to the positive electrode active material. As a result, an interfacial reaction of lithium ions progresses smoothly.

SUMMARY

However, when a positive electrode active material surface is sintered with a ferroelectric having low electron conductivity as described in JP 2011-210694 A, an electron conductive path is interrupted, which causes an increase in the internal resistance of a battery. Therefore, the disclosure provides: a nonaqueous electrolyte secondary battery in which an internal resistance of a battery is reduced to realize high output characteristics; and a positive electrode active material for the nonaqueous electrolyte secondary battery.

A first aspect of the disclosure relates to a positive electrode active material used for a nonaqueous electrolyte secondary battery, the positive electrode active material including a base portion, a dielectric, and a carbonate compound. The base portion is formed of a compound storing and releasing a charge carrier. The dielectric is disposed on at least a part of a surface of the base portion. The carbonate compound is disposed on at least a part of the surface of the base portion.

Here, the dielectric refers to a material that has superior dielectricity over conductivity and functions as an insulator that is not electrically conductive at a direct current voltage. Typically, the dielectric refers to a material having a volume resistivity of $1 \times 10^5$ $\Omega \cdot$m or higher at 20° C. that is a value unique to the material. In addition, the carbonate compound refers to a compound having a carbonate ion.

As a result of a thorough investigation, the present inventors found that, by disposing the dielectric and the carbonate compound on at least a part of the surface of the positive electrode active material, a freezing point of an electrolytic solution present between the dielectric and the carbonate compound is specifically shifted to a low temperature. Specifically, it was found that the viscosity of the electrolytic solution on the positive electrode active material surface is reduced such that the moving speed of the charge carrier such as a lithium ion is increased. Accordingly, by using the positive electrode active material disclosed herein for a positive electrode of a nonaqueous electrolyte secondary battery, the internal resistance of the battery can be effectively reduced.

In a preferable aspect of the positive electrode active material for a nonaqueous electrolyte secondary battery disclosed herein, a mixed portion where the dielectric and the carbonate compound are present adjacent to each other is formed on at least a part of the surface of the base portion. By using the positive electrode active material having the above-described configuration for a positive electrode of a nonaqueous electrolyte secondary battery, the internal resistance of the battery can be more effectively reduced.

Here, "present adjacent to each other" refers to a state where the presence of the dielectric and the carbonate compound adjacent to each other can be detected with an electron microscope or other detecting units.

In a preferable aspect of the positive electrode active material for a nonaqueous electrolyte secondary battery disclosed herein, the dielectric is an oxide having a volume resistivity of $1 \times 10^{10}$ $\Omega \cdot$m or higher at 25° C. By using the dielectric having the above-described configuration, the internal resistance of the battery can be effectively reduced.

In a preferable aspect of the positive electrode active material for a nonaqueous electrolyte secondary battery disclosed herein, the carbonate compound is a carbonate including a metal ion. By using the carbonate compound having the above-described configuration, the internal resistance of the battery can be effectively reduced.

In a preferable aspect of the positive electrode active material for a nonaqueous electrolyte secondary battery disclosed herein, the base portion is formed of a compound storing and releasing a lithium ion and is used for a positive electrode of a lithium ion secondary battery. With the positive electrode active material disclosed herein, the internal resistance of the battery can be further reduced. Therefore, the positive electrode active material is particularly suitable for use in a lithium ion secondary battery for driving a vehicle where high-rate charging and discharging and high output are required.

A second aspect of the disclosure relates to a nonaqueous electrolyte secondary battery including the positive electrode active material disclosed herein in a positive electrode. With the nonaqueous electrolyte secondary battery disclosed herein, the internal resistance of the battery can be further reduced due to the above-described effects of the positive electrode active material.

A third aspect of the disclosure relates to a method of manufacturing a positive electrode active material for a nonaqueous electrolyte secondary battery, the method including: a step of preparing a base portion formed of a compound storing and releasing a charge carrier, a dielectric, and a carbonate compound; and a step of disposing one of the dielectric or the carbonate compound on a surface of the base portion and subsequently disposing another one of the dielectric or the carbonate compound on the surface of the base portion. As a result, the positive electrode active material in which the dielectric and the carbonate compound are disposed on at least a part of the surface of the base portion can be obtained.

A fourth aspect of the disclosure relates to method of manufacturing a positive electrode active material for a nonaqueous electrolyte secondary battery, the method including: a step of preparing a base portion formed of a compound storing and releasing a charge carrier, a dielectric, and a carbonate compound; a step of mixing the dielectric and the carbonate compound to prepare a composite; and a step of disposing the composite on a surface of the base portion. As a result, the positive electrode active material in which the mixed portion where the dielectric and the carbonate compound are present adjacent to each other is formed on at least a part of the surface of the base portion can be obtained.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described. The following embodiment is an example of the disclosure and does not limit the disclosure. In this specification, "nonaqueous electrolyte secondary battery" refers to a battery including a nonaqueous electrolytic solution. "Nonaqueous electrolytic solution" typically refers to a nonaqueous electrolytic solution including a supporting electrolyte in a nonaqueous solvent. In addition, "lithium ion secondary battery" refers to a secondary battery that uses a lithium ion as an electrolyte ion included in a nonaqueous electrolytic solution and realizes electrical conduction using lithium ions present between positive and negative electrodes. Accordingly, in another secondary battery such as "sodium ion secondary battery", another electrolyte ion (for example, a sodium ion) is used as a charge carrier instead of the lithium ion. In addition, "positive electrode active material" or "negative electrode active material" refers to a material capable of reversibly storing and releasing a chemical species as a charge carrier.

Figure 1:
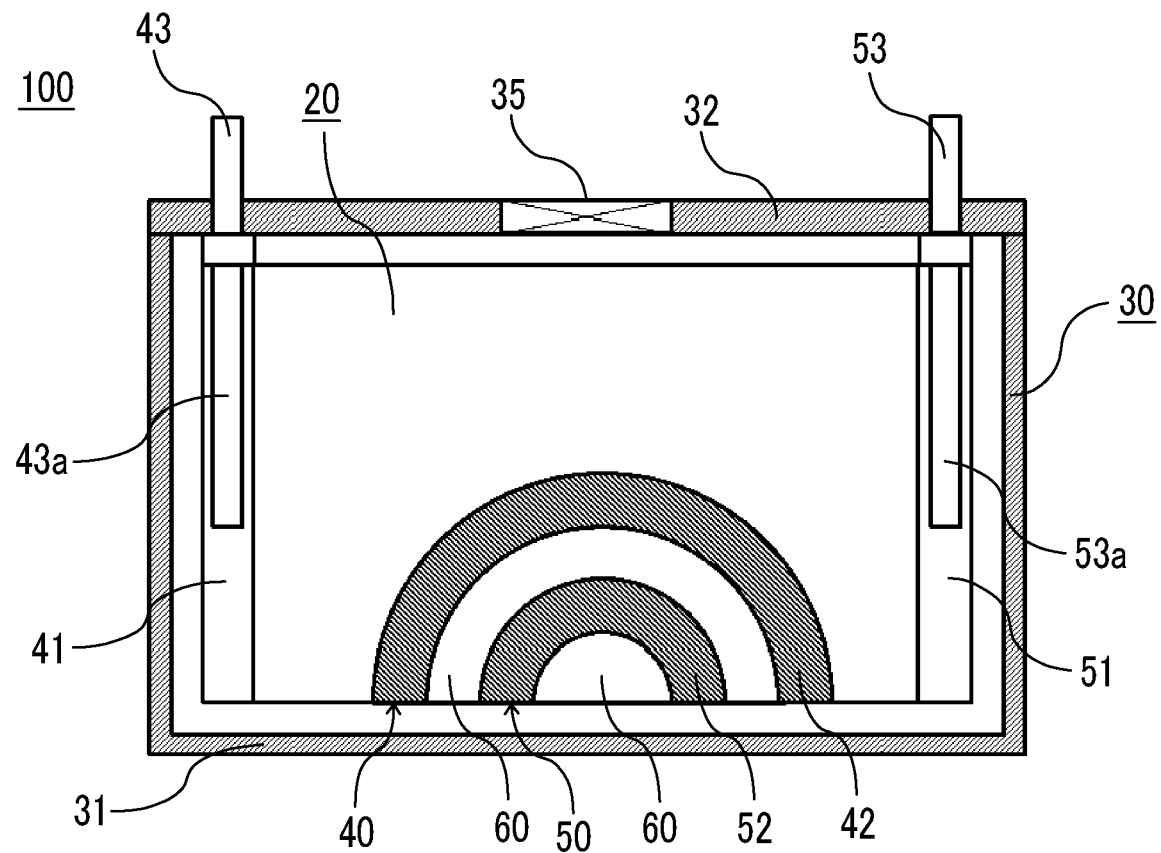
FIG. 1 is a diagram schematically showing a structure of a nonaqueous electrolyte secondary battery according to an embodiment.

FIG. 1 shows a lithium ion secondary battery 100 according to the embodiment. The lithium ion secondary battery 100 includes a wound electrode body 20 and a battery case 30. In the lithium ion secondary battery 100 according to the embodiment, the flat wound electrode body 20 is accommodated in a flat square battery case 30 together with a nonaqueous electrolytic solution (not shown).

The battery case 30 includes: a box-shaped case body 31 having an opening at one end; a lid 32 formed of a rectangular plate member that is attached to the opening to block the opening. Examples of a material of the battery case 30 include aluminum. As shown in FIG. 1, a positive electrode terminal 43 and a negative electrode terminal 53 for external connection are formed on the lid 32. A safety valve 35 is formed between both the terminals of the lid 32 to release an internal pressure of the battery case 30 when the internal pressure increases to be a predetermined value or higher.

The wound electrode body 20 is configured by laminating an elongated positive electrode sheet 40, an elongated negative electrode sheet 50, and two elongated separators 60 such that the separators 60 are interposed between the positive electrode sheet 40 and the negative electrode sheet 50 and winding the obtained laminate.

In the positive electrode sheet 40, a positive electrode active material layer 42 including a positive electrode active material 70 as a major component is provided on opposite surfaces of an elongated positive electrode current collector 41. In this case, the positive electrode active material layer 42 is not provided on one side edge of the positive electrode sheet 40 in a width direction, and a positive electrode active material layer non-forming portion where the positive electrode current collector 41 is exposed with a given width is formed.

Figure 2A:
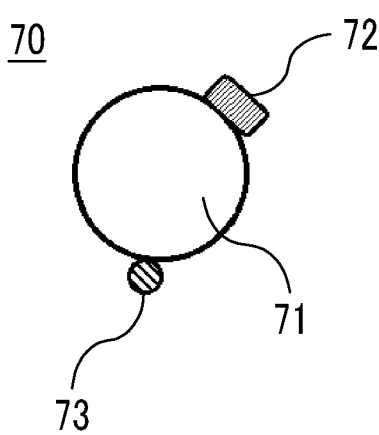
FIG. 2A is a diagram schematically showing a structure of a positive electrode active material according to the embodiment.
Figure 2B:
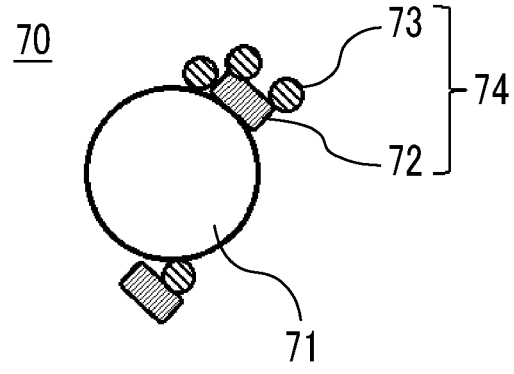
FIG. 2B is a diagram schematically showing the structure of the positive electrode active material according to the embodiment.

Next, the positive electrode active material 70 will be described in detail. FIGS. 2A and 2B are a diagram schematically showing a structure of the positive electrode active material 70 according to the embodiment. The positive electrode active material 70 disclosed herein includes: a base portion 71 that is formed of a compound capable of storing and releasing a charge carrier such as a lithium ion or a sodium ion, that is, a main portion of the positive electrode active material 70; and a dielectric 72 and a carbonate compound 73 that are disposed on at least a part of a surface of the base portion 71. Here, "disposed" refers to a state where the dielectric 72 or the carbonate compound 73 is attached to a part of surfaces of active material particles constituting the base portion 71 of the positive electrode active material 70, and a binding form between the attached dielectric 72 or carbonate compound 73 and the base portion 71 is not limited thereto. The dielectric 72 may be attached to the base portion 71 through the carbonate compound 73, and the carbonate compound 73 may be attached to the base portion 71 through the dielectric 72. As shown in FIG. 2A, the dielectric 72 and the carbonate compound 73 may be disposed to be separated from each other on the surface of the base portion 71. As shown in FIG. 2B, a composite including the dielectric 72 and the carbonate compound 73 may be disposed on the surface of the base portion 71.

Base Portion 71 of Positive Electrode Active Material 70

A configuration of the base portion 71 of the positive electrode active material 70 is not particularly limited and may be formed of a compound capable of storing and releasing charge carriers having various crystal structures such as a layered rock salt structure, a rock salt structure, a spinel structure, or an olivine structure. The crystal structure of the compound capable of storing and releasing the charge carrier can be determined by, for example, X-ray diffraction measurement that is well-known in the related art. Examples of the compound include a lithium nickel composite oxide (for example, $LiNiO_2$) and a lithium nickel cobalt manganese composite oxide (for example, $LiNi_{1/3}Co_{1/3}Mn_{1/3}O_2$).

The average particle size of positive electrode active material particles (secondary particles) is preferably 1 μm to 25 μm. When the base portion 71 is formed of the positive electrode active material particles having the average particle size, satisfactory battery performance can be exhibited more stably. The specific surface area is 0.1 $m^2$/g or more and preferably 0.5 $m^2$/g or more. In addition, the specific surface area is 20 $m^2$/g or less and preferably 10 $m^2$/g or less. When the base portion 71 is formed of the positive electrode active material particles having the above-described structure, satisfactory battery performance can be exhibited more stably even in a state where a mixed portion 74 having a configuration described below is formed on the surface of the base portion 71. Here, "average particle size" refers to a particle size corresponding to a cumulative frequency of 50 vol % in order from the smallest particle size in a volume particle size distribution based on a laser diffraction light scattering method. In addition, "specific surface area" refers to the specific surface area measured with a BET method using nitrogen gas.

Dielectric 72

Examples of the dielectric 72 disposed on the surface of the base portion 71 of the positive electrode active material 70 include various inorganic compounds having a volume resistivity of $1 \times 10^5$ Ω·m or higher at normal temperature (25° C.). As a preferable example, a compound (for example, a metal oxide) having a volume resistivity of $1 \times 10^{10}$ Ω·m or higher can also be used.

Although not particularly limited, a metal oxide having a crystal structure represented by any one of Formula: $XYO_3$, $X_2Y_2O_7$, or $(XX'_3)Y_4O_{12}$ can also be used as a preferable example of the dielectric 72. In the formula, X and X' each independently represent at least one element selected from the group consisting of alkali metal elements, alkali earth metal elements, rare earth elements, Cu, Pb, and Bi, and Y represents at least one element selected from the group consisting of transition metal elements and Sn.

The use of a metal oxide having a volume resistivity of $1 \times 10^{12}$ Ω·m or higher at normal temperature (25° C.) is particularly preferable. Specific preferable examples of the dielectric 72 (metal oxide) include respective Examples described below.

Carbonate Compound 73

Examples of the carbonate compound 73 disposed on the surface of the base portion 71 of the positive electrode active material 70 include a compound including a carbonate ion. As a preferable example, various carbonates including a metal ion can also be used.

Although not particularly limited, a carbonate including a metal ion selected from the group consisting of alkali metal elements, alkali earth metal elements, transition metal elements, rare earth elements, Sn, Pb, and Bi can also be used as a preferable example of the carbonate compound 73. The use of a compound including the metal ion included in the dielectric 72 and a carbonate ion is particularly preferable. Specific preferable examples of the carbonate compound 73 include respective Examples described below.

The dielectric 72 and the carbonate compound 73 can be disposed on the surface of the base portion 71 of the positive electrode active material 70 using various chemical and physical methods. For example, the material for forming the dielectric 72 or the carbonate compound 73 is attached to the base portion 71 of the positive electrode active material 70 using various vapor deposition methods or a sputtering method and is heated or fired under oxidizing conditions. As a result, the desired dielectric 72 or carbonate compound 73 formed of the material can be disposed on the base portion 71 of the positive electrode active material 70.

As a preferable and simple method, mechanochemical treatments that are performed using various mechanochemical devices can also be used. For example, by causing a desired mechanochemical reaction to occur using a pulverizing and mixing device such as a ball mill, a planetary mill, or a bead mill, the positive electrode active material particles having the configuration disclosed herein can also be manufactured. For example, the positive electrode active material particles for forming the base portion 71 and dielectric particles and/or carbonate compound particles are put into a predetermined mechanochemical device (such as a dry bead mill), and kinetic energy is applied thereto at a predetermined rotating speed for a predetermined period of time. As a result, the dielectric 72 and/or the carbonate compound 73 can be disposed on the surface of the base portion 71 of the positive electrode active material 70.

In addition, by appropriately adjusting the amount of the positive electrode active material, the amount of the dielectric, and the amount of the carbonate compound during the mechanochemical treatment, the mixed portion 74 where the dielectric 72 and the carbonate compound 73 are present adjacent to each other can be formed on at least a part of the surface of the base portion 71. Alternatively, by mixing the dielectric 72 and the carbonate compound 73 with each other in advance, performing a mechanochemical treatment on the mixture to prepare a composite including the dielectric 72 and the carbonate compound 73, mixing the composite with the positive electrode active material 70, and performing a mechanochemical treatment on the mixture, the mixed portion 74 where the dielectric 72 and the carbonate compound 73 are present adjacent to each other can be formed on the surface of the positive electrode active material 70.

A ratio between the amount of the positive electrode active material, the amount of the dielectric, and the amount of the carbonate compound for forming the mixed portion 74 is not particularly limited because it is variable depending on characteristics such as composition or particle size of each of the positive electrode active material 70, the dielectric 72, and the carbonate compound 73.

The presence and elemental composition of the mixed portion 74 formed on the surface of the base portion 71 of the positive electrode active material 70 can be verified using various methods in the related art. For example, the positive electrode active material particles or the positive electrode active material layer 42 including the positive electrode active material particles is embedded with a resin, and a sample for STEM observation of a particle section is prepared by focused ion beam (FIB) processing. The mixed portion 74 can be detected by observing this sample with a STEM. In addition, quantitative determination can be performed spot by spot using a scanning electron microscope-energy dispersive X-ray spectrometer (STEM-EDX). Alternatively, a method such as secondary ion mass spectrometry (SIMS), X-ray photoelectron spectroscopy (XPS), X-ray diffraction (XRD), or X-ray fluorescence (XRF) may also be used.

The content of each of the dielectric 72 and the carbonate compound 73 disposed on the surface of the base portion 71 of the positive electrode active material 70 is not particularly limited as long as the dielectric 72 and the carbonate compound 73 are disposed on the surface of the positive electrode active material 70 in amounts suitable for the object of the disclosure. For example, the content of the dielectric 72 is preferably about 0.01 to 10 mass % with respect to the total mass of the base portion 71 of the positive electrode active material 70. In addition, the content of the carbonate compound 73 is preferably about 0.001 to 5 mass % with respect to the total mass of the base portion 71 of the positive electrode active material 70. With the lithium ion secondary battery 100 constructed using the positive electrode active material 70 having the surface on which the dielectric 72 and the carbonate compound 73 are disposed in the above-described contents, reduction in battery internal resistance, high capacity retention, and high moisture resistance can be suitably realized.

With the positive electrode active material 70 disclosed herein, reduction in battery internal resistance can be satisfactorily realized. Therefore, the positive electrode active material 70 can be suitably used as a positive electrode active material of a lithium ion secondary battery or other nonaqueous electrolyte secondary batteries. A method of manufacturing a lithium ion secondary battery or other nonaqueous electrolyte secondary batteries, various materials to be used, the form of the battery, and the like are not particularly limited may be the same as those in the related art as long as a positive electrode includes the positive electrode active material 70 disclosed herein.

The positive electrode active material layer 42 can be formed by mixing the positive electrode active material 70 including the above-described mixed portion 74 on the surface with various additives to prepare a composition and attaching the prepared composition to at least one surface of the positive electrode current collector 41.

Examples of the additives other than the positive electrode active material 70 included in the positive electrode active material layer 42 include a conductive material and a binder. These additives are not particularly limited as long as they are well-known additives of the related art used in the lithium ion secondary battery 100. As the conductive material, for example, a carbon material such as carbon black or carbon fiber can be used. In addition, as the binder, for example, polyvinylidene fluoride (PVDF), polytetrafluoroethylene (PTFE), or styrene-butadiene rubber (SBR) can be used.

On the other hand, in the negative electrode sheet 50, as in the positive electrode sheet 40, a negative electrode active material layer 52 including a negative electrode active material as a major component is provided on opposite surfaces of an elongated negative electrode current collector 51 In this case, the negative electrode active material layer 52 is not provided on one side edge of the negative electrode sheet 50 in a width direction, and a negative electrode active material layer non-forming portion where the negative electrode current collector 51 is exposed with a given width is formed.

In the lithium ion secondary battery 100 disclosed herein, among various materials that can be used as the negative electrode active material of the lithium ion secondary battery 100, one kind alone and a combination of two or more kinds can be used. For example, a carbon material such as graphite, non-graphitizable carbon, graphitizable carbon, carbon nanotube, or a material having a structure including a combination thereof can be used. In particular, a graphite material is preferable. The form of the graphite material to be used as the negative electrode active material is not particularly limited and may be a flaky shape or a spherical shape. In addition, the average particle size of the graphite particle is not particularly limited and is preferably 5 μm to 50 μm.

The negative electrode active material layer 52 can be formed by mixing the above-described negative electrode active material with other additives to prepare a composition and attaching the prepared composition to the negative electrode current collector 51. Examples of the additives include a binder. For example, the same additives that can be included in the positive electrode active material layer 42 can be used. As other additives, for example, a thickener or a dispersant can be appropriately used. For example, as the thickener, carboxymethyl cellulose (CMC) or methyl cellulose (MC) is preferably used.

The separator 60 is a member that insulates the positive electrode sheet 40 and the negative electrode sheet 50 from each other. In the embodiment, the separator 60 includes an elongated substrate with a predetermined width including a plurality of micropores. For example, a material of the separator 60 may be a resin such as polyethylene (PE), polypropylene (PP), polyester, cellulose, or polyamide. For example, in order to prevent internal short-circuiting, a porous heat resistant layer containing inorganic compound particles (inorganic filler) may be provided on a surface of the separator 60.

In the wound electrode body 20, the positive electrode active material layer non-forming portion of the positive electrode sheet 40 and the negative electrode active material layer non-forming portion of the negative electrode sheet 50 protrude to opposite sides in the width direction of the separator 60. Among the positive electrode terminal 43 and the negative electrode terminal 53 attached to the battery case 30, the positive electrode terminal 43 and the positive electrode active material layer non-forming portion are connected to each other at a welding position 43a, and the negative electrode terminal 53 and the negative electrode active material layer non-forming portion are connected to each other at a welding position 53a. The wound electrode body 20 is accommodated in a flat internal space of the case body 31. The case body 31 is blocked with the lid 32 after accommodating the wound electrode body 20. This wound electrode body 20 may be flat and, for example, can adopt an appropriate well-known shape and an appropriate well-known configuration of the related art according to the shape and intended use of the battery. Specifically, for example, a cylindrical wound electrode body or a flat laminated electrode body can be adopted.

As the nonaqueous electrolytic solution, the same nonaqueous electrolytic solution as that used for the nonaqueous electrolyte secondary battery in the related art can be used without any particular limitation. Typically, the nonaqueous electrolytic solution has, for example, a composition in which an appropriate nonaqueous solvent contains a supporting electrolyte. As the nonaqueous solvent, one kind or two or more kinds selected from various known organic solvents, which can be used as a nonaqueous electrolytic solution of a general lithium ion secondary battery, can be adopted. Specific examples of the nonaqueous solvent include carbonates, ethers, esters, nitriles, sulfones, and lactones. Specific examples of the nonaqueous solvent include ethylene carbonate (EC), propylene carbonate (PC), diethyl carbonate (DEC), dimethyl carbonate (DMC), and ethyl methyl carbonate (EMC). As the supporting electrolyte, one kind or two or more kinds selected from various known compounds, which can be used as a supporting electrolyte of a general lithium ion secondary battery, can be adopted. Specific examples of the supporting electrolyte include $LiPF_6$, $LiBF_4$, $LiClO_4$, and $Li(CF_3SO_2)_2N$. Among these, $LiPF_6$ is preferable. The concentration of the supporting electrolyte is preferably 0.7 to 1.3 mol/L.

The nonaqueous electrolytic solution may appropriately contain a component other than the nonaqueous solvent and the supporting electrolyte. Examples of the optional component include: a film forming agent such as lithium bis (oxalato)borate (LiBOB), vinylene carbonate (VC), vinyl ethylene carbonate (VEC), or fluoroethylene carbonate (FEC); a compound which may produce gas during overcharging, such as biphenyl (BP) or cyclohexylbenzene (CHB); and a viscosity modifier.

In the lithium ion secondary battery 100 according to the embodiment, through the opening of the case body 31, the wound electrode body 20 is accommodated in the case body 31 and the appropriate nonaqueous electrolytic solution is disposed in the case body 31. Next, by sealing the opening and the lid 32 by welding or the like, the construction of the lithium ion secondary battery 100 is completed. The sealing of the battery case 30 and the disposition of the nonaqueous electrolytic solution may be the same as those which are performed when a lithium ion secondary battery of the related art is manufactured. These processes are not characteristics of the disclosure. This way, the construction of the lithium ion secondary battery 100 according to the embodiment is completed.

Hereinafter, several test examples relating to the disclosure will be described, but these test examples are not intended to limit the disclosure.

Test Example 1

In this test example, regarding lithium ion secondary batteries constructed using the positive electrode active materials 70 that were prepared using various kinds of the dielectrics 72 and the carbonate compounds 73, battery internal resistance measurement, a cycle durability test, and a moisture resistance evaluation test were performed.

Example 1

Preparation of Positive Electrode Active Material 70

Figure 3:
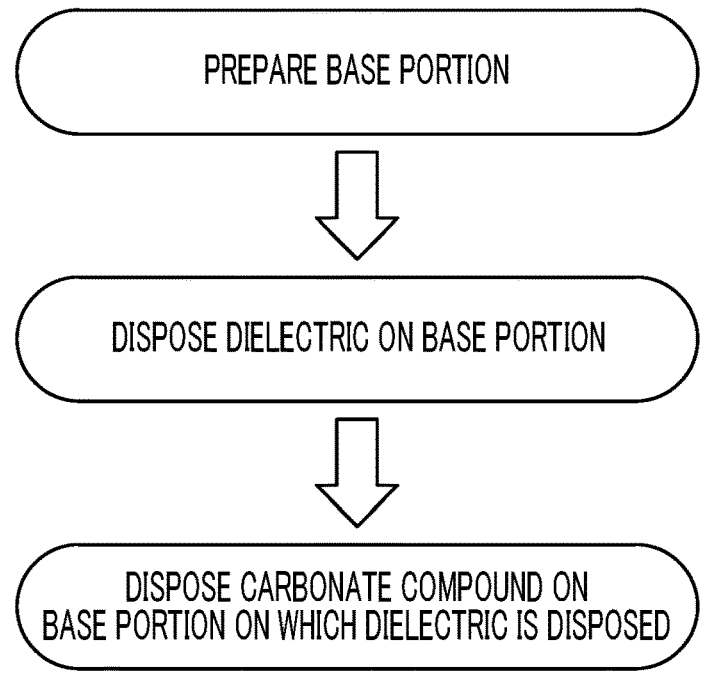
FIG. 3 is a flowchart showing a manufacturing procedure of the positive electrode active material according to the embodiment.

FIG. 3 is a flowchart showing a manufacturing procedure of the positive electrode active material 70 according to Example 1. Specifically, the positive electrode active material 70 according to Example 1 was prepared as follows. First, respective sulfates of Ni, Co, and Mn as constituent metal elements other than Li were dissolved in distilled water in predetermined amounts. Next, a basic aqueous solution having a pH of 11 to 14, for example, a NaOH aqueous solution was added to the obtained aqueous solution for neutralization, and a hydroxide including the above metal element was precipitated to obtain a ram material hydroxide in a sol state. Next, this precursor was mixed with a Li supply source, for example, lithium carbonate and was fired at 900° C. for 15 hours. By performing a pulverization treatment after cooling, the base portion 71 of the positive electrode active material 70 formed of $LiNi_{1/3}Co_{1/3}Mn_{1/3}O_2$ and having an average particle size of about 10 μm was obtained.

The base portion 71 of the positive electrode active material 70 obtained as described above was mixed with a dielectric precursor solution in which Sr alkoxide and Ti alkoxide were dissolved in a solvent in predetermined amounts. As a result, the dielectric 72 was attached to the base portion 71 of the positive electrode active material 70. By drying the base portion 71 at 700° C. for 10 hours, the solvent was removed.

Finally, powdered $SrCO_3$ and the base portion 71 of the positive electrode active material 70 on which the dielectric 72 was disposed were mixed with each other in predetermined amounts and were fired at 700° C. for about 10 hours. As a result, the carbonate compound 73 was further attached to the base portion 71 of the positive electrode active material 70 on which the dielectric 72 was disposed. This way, the positive electrode active material 70 in which at least the dielectric 72 and the carbonate compound 73 were disposed on the base portion 71 was obtained. In the positive electrode active material 70 according to Example 1, the content of $SrTiO_3$ as the dielectric 72 is 1 mass % and the content of $SrCO_3$ as the carbonate compound 73 is 1 mass % with respect to 100 mass % of the base portion 71 of the positive electrode active material 70.

Preparation of Positive Electrode Sheet 40

The positive electrode active material 70 prepared as described, acetylene black as a conductive material, polyvinylidene fluoride as a binder, and a dispersant were weighed such that a ratio was 80:8:2:0.2. These weighed materials were mixed with N-methylpyrrolidone to prepare a positive electrode paste. This positive electrode paste was applied to opposite surfaces of elongated aluminum foil (positive electrode current collector 41) and was dried. As a result, the positive electrode sheet 40 was prepared.

Preparation of Negative Electrode Sheet 50

In addition, natural graphite (C) as a negative electrode active material, styrene-butadiene rubber (SBR) as a binder, carboxymethyl cellulose (CMC) as a thickener were weighed such that a mass ratio (C:SBR:CMC) thereof was 80:10:10. The weighed materials were mixed with ion exchange water as a solvent to prepare a negative electrode paste. This negative electrode paste was applied elongated Cu foil (negative electrode current collector 51) and was dried. As a result, the negative electrode sheet 50 was prepared.

Preparation of Nonaqueous Electrolytic Solution Preparation

As the nonaqueous electrolytic solution, a solution was used in which $LiPF_6$ as a supporting electrolyte was dissolved in a mixed solvent at a concentration of 1.0 mol/L, the mixed solvent containing ethylene carbonate (EC), dimethyl carbonate (DMC), and ethyl methyl carbonate (EMC) at a volume ratio (EC:DMC:EMC) of 1:1:1.

The positive electrode sheet 40 and the negative electrode sheet 50 that were prepared as described above were laminated with the separators 60 interposed therebetween. As a result, the wound electrode body 20 was prepared. As the separators 60, a porous film having a three-layer structure of polypropylene (PP)/polyethylene (PE)/polypropylene (PP) was used. The prepared wound electrode body 20 and the nonaqueous electrolytic solution were put into the metal case body 31, and the case body 31 was sealed with the lid 32. As a result, the lithium ion secondary battery 100 according to Example 1 was constructed.

Activation Process and Initial Capacity Measurement

In a temperature environment of 25° C., the lithium ion secondary battery was charged at a constant current at a rate of ⅓ C until the voltage reached 4.2 V, and was charged at a constant voltage until the current value reached 1/50 V. As a result, the lithium ion secondary battery was fully charged. Next, in a temperature environment of 25° C., the lithium ion secondary battery was discharged at a constant current at a rate of ⅓ C until the voltage reached 3 V. At this time, the CC discharge capacity was set as the initial capacity. Here, 1 C refers to a current value at which the battery capacity estimated from the theoretical capacity of the active material can be charged in one hour.

Measurement of Battery Internal Resistance

Next, the internal resistance of the lithium ion secondary battery was measured in the following procedure. First, the voltage of the lithium ion secondary battery was adjusted to 3.7 V. Next, in a temperature environment of −5° C., the lithium ion secondary battery adjusted to a state of open circuit voltage: 3.7 V was discharged at a constant current at a rate of 20 C for 8 seconds to measure the voltage drop amount. Next, the voltage drop amount was divided by the discharge current value to calculate the internal resistance of the battery. The results are shown in the corresponding items of Table 1. The internal resistance value of the lithium ion secondary battery according to each of Examples and Comparative Examples in the table is a value relative to a reference (1) as the internal resistance of a lithium ion secondary battery according to Comparative Example 1 described below.

Cycle Durability Measurement

Further, high-temperature cycle measurement was performed on the lithium ion secondary battery in the following procedure. 200 cycles of charging and discharging the lithium ion secondary battery were repeated at a charge and discharge rate of 10 C in a voltage range of 3.0 V to 4.2 V at 60° C. A value obtained by dividing the discharge capacity in the 200-th cycle by the initial capacity was set as a capacity retention. The results are shown in the corresponding items of Table 1.

Moisture Resistance Evaluation Test

The positive electrode sheet 40 prepared as described above was stored in a high-humidity bath at 25° C. and a humidity of 100% for 12 hours. Next, the lithium ion secondary battery 100 was constructed as described above, and the activation process and the initial capacity measurement were performed as described above. The results are shown in the corresponding items of Table 1. The internal resistance value of the lithium ion secondary battery according to each of Examples and Comparative Examples in the table is a value relative to a reference (1) as the internal resistance of a lithium ion secondary battery according to Comparative Example 1 described below.

Examples 2 to 13

The positive electrode active material 70 according to each of Examples was prepared using the same materials and the same processes as those of Example 1, except that a combination of the dielectric 72 and the carbonate compound 73 shown in Table 1 was adopted. Using this positive electrode active material 70, a lithium ion secondary battery was constructed as described above in Example 1, and the characteristic evaluations were performed as described above. The results are shown in the corresponding items of Table 1.

Comparative Example 1

The positive electrode active material 70 including only the base portion 71, that is, the positive electrode active material 70 in which the dielectric 72 and the carbonate compound 73 were not disposed was obtained using the same materials and the same processes as those of Example 1. Using this positive electrode active material 70, a lithium ion secondary battery was constructed as described above in Example 1, and the characteristic evaluations were performed as described above. The results are shown in the corresponding items of Table 1.

Comparative Example 2

The positive electrode active material 70 in which only the dielectric 72 was disposed on the surface of the base portion 71, that is, the positive electrode active material 70 in which the carbonate compound 73 was not disposed was obtained using the same materials and the same processes as those of Example 1. Using this positive electrode active material 70, a lithium ion secondary battery was constructed as described above in Example 1, and the characteristic evaluations were performed as described above. The results are shown in the corresponding items of Table 1.

Comparative Example 3

The positive electrode active material 70 in which only the carbonate compound 73 was disposed on the surface of the base portion 71, that is, the positive electrode active material 70 in which the dielectric 72 was not disposed was obtained using the same materials and the same processes as those of Example 1. Using this positive electrode active material 70, a lithium ion secondary battery was constructed as described above in Example 1, and the characteristic evaluations were performed as described above. The results are shown in the corresponding items of Table 1.

TABLE 1

| Sample | Dielectric | Carbonate Compound | Internal Resistance (Relative Value) | Capacity Resistance (%) | Discharge Capacity (Relative Value) |
|---|---|---|---|---|---|
| Comparative Example 1 | — | — | 1 | 50 | 1 |
| Comparative Example 2 | $SrTiO_3$ | — | 0.98 | 58 | 1.05 |
| Comparative Example 3 | — | $SrCO_3$ | 1.5 | 41 | 0.8 |
| Example 1 | $SrTiO_3$ | $SrCO_3$ | 0.51 | 80.11 | 4.11 |
| Example 2 | $BaTiO_3$ | $BaCO_3$ | 0.5 | 80.15 | 4.01 |
| Example 3 | $BiFeO_3$ | $(BiO)_2CO_3$ | 0.52 | 80.21 | 4.05 |
| Example 4 | $BiFeO_3$ | $FeCO_3$ | 0.49 | 80.18 | 4.03 |
| Example 5 | $CaCuTi_4O_{12}$ | $CaCO_3$ | 0.53 | 80.12 | 4.08 |

TABLE 1-continued

| Sample | Dielectric | Carbonate Compound | Internal Resistance (Relative Value) | Capacity Resistance (%) | Discharge Capacity (Relative Value) |
|---|---|---|---|---|---|
| Example 6 | $NaNbO_3$ | $Na_2CO_3$ | 0.51 | 80.15 | 4.11 |
| Example 7 | $Sr_2Ta_2O_7$ | $SrCO_3$ | 0.55 | 80.06 | 4.08 |
| Example 8 | $KNbO_3$ | $K_2CO_3$ | 0.51 | 80.03 | 4.06 |
| Example 9 | $PbZrO_3$ | $PbCO_3$ | 0.53 | 80.12 | 4.13 |
| Example 10 | $Ba_{0.7}La_{0.3}TiO_3$ | $BaCO_3$ | 0.5 | 80.09 | 4.06 |
| Example 11 | $BaMn_{0.3}Ti_{0.7}O_3$ | $BaCO_3$ | 0.48 | 80.05 | 4.01 |
| Example 12 | $BaCo_{0.3}Ti_{0.7}O_3$ | $BaCO_3$ | 0.49 | 80.01 | 4.08 |
| Example 13 | $BaHfO_3$ | $BaCO_3$ | 0.52 | 80.02 | 4 |

As clearly seen from the results of the respective Examples shown in Table 1, in the lithium ion secondary battery including the positive electrode active material 70 including both the dielectric 72 and the carbonate compound 73 in the positive electrode, reduction in battery internal resistance, high capacity retention, and high moisture resistance were realized irrespective of the kinds of the dielectric 72 and the carbonate compound 73.

Test Example 2

In this test example, the positive electrode active material 70 in which the mixed portion 74 where the dielectric 72 and the carbonate compound 73 were present adjacent to each other, that is, the composite including the dielectric 72 and the carbonate compound 73 was formed on the surface of the base portion 71, was prepared. Using this positive electrode active material 70, a lithium ion secondary battery was constructed, and the same evaluations as those of Test Example 1 were performed.

Example 14

Figure 4:
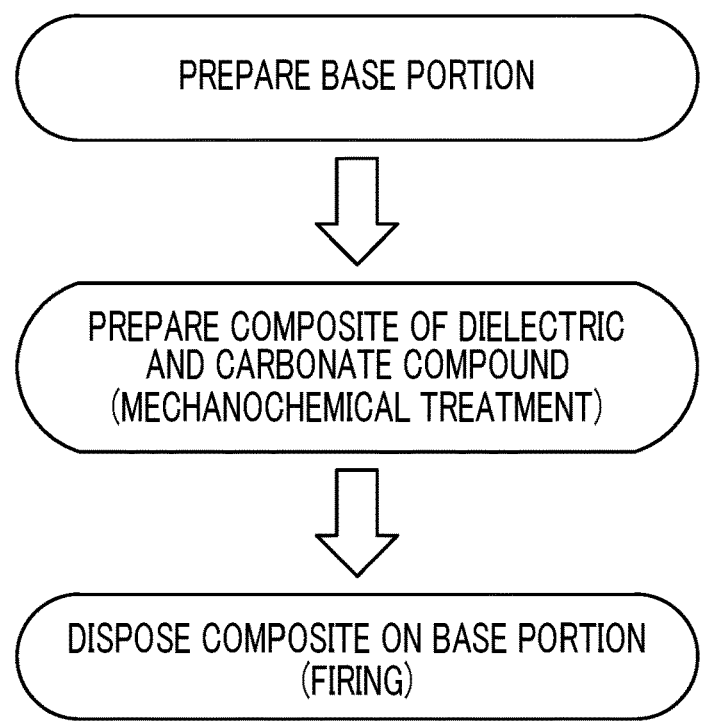
FIG. 4 is a flowchart showing a modification example of the manufacturing procedure of the positive electrode active material according to the embodiment.

FIG. 4 is a flowchart showing a manufacturing procedure of the positive electrode active material 70 according to Example 14. Specifically, the positive electrode active material 70 according to Example 14 was prepared as follows. $SrTiO_3$ as the dielectric 72 and $SrCO_3$ as the carbonate compound 73 were mixed with each other in advance in predetermined amounts and were stirred using a mechanochemical device in advance at 5000 rpm for about 5 minutes. As a result, powder as a composite including the dielectric 72 and the carbonate compound 73 was obtained. The positive electrode active material 70 according to Example 14 was prepared using the same method as that of Example 1, except that the obtained powder was mixed with the base portion 71 of the positive electrode active material 70 obtained using the same method as that of Example 1 and was fired at 700° C. for 10 hours. Next, using this positive electrode active material 70, a lithium ion secondary battery was constructed as described above in Example 1, and the characteristic evaluations were performed as described above. The results are shown in the corresponding items of Table 2.

TABLE 2

| Sample | Dielectric | Carbonate Compound | Internal Resistance (Relative Value) | Capacity Resistance (%) | Discharge Capacity (Relative Value) |
|---|---|---|---|---|---|
| Comparative Example 1 | — | — | 1 | 50 | 1 |
| Example 1 | $SrTiO_3$ | $SrCO_3$ | 0.51 | 80.11 | 4.11 |
| Example 14 | $SrTiO_3$ (Composite) | $SrCO_3$ (Composite) | 0.39 | 95.01 | 5.43 |

As clearly seen from the results of Example 14 shown in Table 2, by forming the mixed portion 74 where the dielectric 72 and the carbonate compound 73 were present adjacent to each other on at least a part of the surface of the base portion 71, reduction in battery internal resistance, high capacity retention, and high moisture resistance can be more suitably realized.

Test Example 3

In this test example, the positive electrode active material 70 was prepared while changing the contents of the dielectric 72 and the carbonate compound 73 disposed on the base portion 71 of the positive electrode active material 70. Using this positive electrode active material 70, a lithium ion secondary battery was constructed, and the same evaluations as those of Test Example 1 were performed.

Examples 15 to 26

The positive electrode active material 70 according to each of Examples was manufactured using the same method as that of Example 14, except that the amount of $SrTiO_3$ as the dielectric 72 supplied or the amount of $SrCO_3$ as the carbonate compound 73 supplied to the mechanochemical device was changed. Next, using this positive electrode active material 70, a lithium ion secondary battery was constructed as described above in Example 1, and the characteristic evaluations were performed as described above. The results are shown in the corresponding items of Table 3.

TABLE 3

| Sample | Dielectric | Carbonate Compound | Content of Dielectric (wt %) | Content of Carbonate Compound (wt %) | Internal Resistance (Relative Value) | Capacity Resistance (%) | Discharge Capacity (Relative Value) |
|---|---|---|---|---|---|---|---|
| Comparative Example 1 | — | — | — | — | 1 | 50 | 1 |
| Example 15 | $SrTiO_3$ (Composite) | $SrCO_3$ (Composite) | 0.005 | 1 | 0.45 | 89.1 | 4.99 |
| Example 16 | $SrTiO_3$ (Composite) | $SrCO_3$ (Composite) | 0.01 | 1 | 0.38 | 94.1 | 5.51 |
| Example 17 | $SrTiO_3$ (Composite) | $SrCO_3$ (Composite) | 2 | 1 | 0.37 | 95.3 | 5.49 |
| Example 18 | $SrTiO_3$ (Composite) | $SrCO_3$ (Composite) | 5 | 1 | 0.35 | 95.7 | 5.51 |
| Example 19 | $SrTiO_3$ (Composite) | $SrCO_3$ (Composite) | 10 | 1 | 0.36 | 95.3 | 5.44 |
| Example 20 | $SrTiO_3$ (Composite) | $SrCO_3$ (Composite) | 11 | 1 | 0.46 | 88.2 | 4.96 |
| Example 21 | $SrTiO_3$ (Composite) | $SrCO_3$ (Composite) | 1 | 0.0005 | 0.44 | 88.9 | 4.97 |
| Example 22 | $SrTiO_3$ (Composite) | $SrCO_3$ (Composite) | 1 | 0.001 | 0.34 | 94.4 | 5.49 |
| Example 23 | $SrTiO_3$ (Composite) | $SrCO_3$ (Composite) | 1 | 0.01 | 0.33 | 95.2 | 5.51 |
| Example 24 | $SrTiO_3$ (Composite) | $SrCO_3$ (Composite) | 1 | 3 | 0.36 | 95.4 | 5.48 |
| Example 25 | $SrTiO_3$ (Composite) | $SrCO_3$ (Composite) | 1 | 5 | 0.38 | 96.1 | 5.52 |
| Example 26 | $SrTiO_3$ (Composite) | $SrCO_3$ (Composite) | 1 | 6 | 0.43 | 88.7 | 4.96 |

As clearly seen from the results of the respective Examples shown in Table 3, by providing both the dielectric 72 and the carbonate compound 73, reduction in battery internal resistance, high capacity retention, and high moisture resistance can be more suitably realized. In addition, the content of the dielectric 72 was preferably 0.01 to 10 mass % with respect to the total mass of the base portion 71 of the positive electrode active material 70. In addition, the content of the carbonate compound 73 was preferably 0.001 to 5 mass % with respect to the total mass of the base portion 71 of the positive electrode active material 70.

Test Example 4

In this test example, the positive electrode active materials 70 having different compositions or different crystal structures were prepared. Using each of the positive electrode active materials 70, a lithium ion secondary battery was constructed, and the same evaluations as those of Test Example 1 were performed.

Comparative Examples 4 to 8 and Examples 27 to 31

The positive electrode active material 70 according to each of Examples was prepared using the same materials and the same processes as those of Example 14 or Comparative Example 1, except that the base portion 71 was formed of a material represented by a structural formula shown in Table 4. Next, using this positive electrode active material 70, a lithium ion secondary battery was constructed as described above in Example 1, and the characteristic evaluations were performed as described above. The results are shown in the corresponding items of Table 4.

TABLE 4

| Sample | Positive Electrode Active Material | Dielectric | Carbonate Compound | Internal Resistance (Relative Value) | Capacity Resistance (%) | Discharge Capacity (Relative Value) |
|---|---|---|---|---|---|---|
| Comparative Example 4 | $LiCoO_2$ | — | — | 1 | 49.1 | 1 |
| Example 27 | $LiCoO_2$ | SrTiOs (Composite) | $SrCO_3$ (Composite) | 0.33 | 95.6 | 5.55 |
| Comparative Example 15 | $LiMn_2O_4$ | — | — | 1 | 47.1 | 1 |
| Example 28 | $LiMn_2O_4$ | $SrTiO_3$ (Composite) | $SrCO_3$ (Composite) | 0.39 | 94.5 | 5.49 |
| Comparative Example 16 | $LiNiO_2$ | — | — | 1 | 47 | 1 |
| Example 29 | $LiNiO_2$ | $SrTiO_3$ (Composite) | $SrCO_3$ (Composite) | 0.37 | 95.2 | 5.38 |
| Comparative Example 7 | $LiN_{0.5}Mn_{1.5}O_4$ | — | — | 1 | 48.1 | 1 |
| Example 30 | $LiN_{0.5}Mn_{1.5}O_4$ | $SrTiO_3$ (Composite) | $SrCO_3$ (Composite) | 0.36 | 94.6 | 5.51 |

TABLE 4-continued

| Sample | Positive Electrode Active Material | Dielectric | Carbonate Compound | Internal Resistance (Relative Value) | Capacity Resistance (%) | Discharge Capacity (Relative Value) |
|---|---|---|---|---|---|---|
| Comparative Example 8 | $LiNi_{0.8}Co_{0.15}Al_{0.05}O_2$ | — | — | 1 | 49.9 | 1 |
| Example 31 | $LiNi_{0.8}Co_{0.15}Al_{0.05}O_2$ | $SrTiO_3$ (Composite) | $SrCO_3$ (Composite) | 0.38 | 95.1 | 5.49 |

As clearly seen from the results of the respective Examples shown in Table 4, in the lithium ion secondary battery including the positive electrode active material 70 according to each of Examples in including both the dielectric 72 and the carbonate compound 73, reduction in battery internal resistance, high capacity retention, and high moisture resistance can be more suitably realized irrespective of the composition or the crystal structure of the base portion 71.

Hereinabove, the battery and the method of manufacturing the battery disclosed herein have been described in various ways. However, unless specified otherwise, the embodiment and the Examples described herein do not limit the disclosure.

What is claimed is:

1. A positive electrode active material used for a nonaqueous electrolyte secondary battery, the positive electrode active material comprising:
    a base portion formed of a compound storing and releasing a charge carrier;
    a dielectric disposed on at least a part of a surface of the base portion; and
    a carbonate compound disposed on at least a part of the surface of the base portion,
    wherein the carbonate compound includes a metal ion selected from the group consisting of Sn, Pb, Bi, Ba, Ca and Fe.

2. The positive electrode active material according to claim 1, wherein a mixed portion where the dielectric and the carbonate compound are in contact with each other is formed on at least a part of the surface of the base portion.

3. The positive electrode active material according to claim 1, wherein the dielectric is an oxide having a volume resistivity of $1 \times 10^{10}$ Ω·m or higher at 25° C.

4. The positive electrode active material according to claim 1, wherein the carbonate compound is a carbonate including a metal ion.

5. The positive electrode active material according to claim 1, wherein the base portion is formed of a compound storing and releasing a lithium ion and is used for a positive electrode of a lithium ion secondary battery.

6. A nonaqueous electrolyte secondary battery comprising the positive electrode active material according to claim 1 in a positive electrode.

7. A method of manufacturing the positive electrode active material for a nonaqueous electrolyte secondary battery according to claim 1, the method comprising:
    a step of preparing a base portion formed of a compound storing and releasing a charge carrier, a dielectric, and a carbonate compound; and
    a step of disposing one of the dielectric or the carbonate compound on a surface of the base portion and subsequently disposing another one of the dielectric or the carbonate compound on the surface of the base portion,
    wherein the carbonate compound includes a metal ion selected from the group consisting of Sn, Pb, Bi, Ba, Ca and Fe.

8. A method of manufacturing the positive electrode active material for a nonaqueous electrolyte secondary battery according to claim 1, the method comprising:
    a step of preparing a base portion formed of a compound storing and releasing a charge carrier, a dielectric, and a carbonate compound;
    a step of mixing the dielectric and the carbonate compound to prepare a composite; and
    a step of disposing the composite on a surface of the base portion,
    wherein the carbonate compound includes a metal ion selected from the group consisting of Sn, Pb, Bi, Ba, Ca and Fe.

* * * * *